(12) United States Patent
Xiao et al.

(10) Patent No.: US 8,191,113 B2
(45) Date of Patent: *May 29, 2012

(54) TRUSTED NETWORK CONNECT SYSTEM BASED ON TRI-ELEMENT PEER AUTHENTICATION

(75) Inventors: Yuelei Xiao, Shaanxi (CN); Jun Cao, Shaanxi (CN); Xiaolong Lai, Shaanxi (CN); Zhenhai Huang, Shaanxi (CN)

(73) Assignee: China Iwncomm Co., Ltd., Shaanxi (CN)

( * ) Notice: Subject to any disclaimer, the term of this patent is extended or adjusted under 35 U.S.C. 154(b) by 314 days.

This patent is subject to a terminal disclaimer.

(21) Appl. No.: 12/628,903

(22) Filed: Dec. 1, 2009

(65) Prior Publication Data

US 2010/0077213 A1 Mar. 25, 2010

Related U.S. Application Data

(63) Continuation of application No. PCT/CN2008/071699, filed on Jul. 21, 2008.

(30) Foreign Application Priority Data

Aug. 3, 2007 (CN) .......................... 2007 1 0018414

(51) Int. Cl.
*G06F 7/04* (2006.01)
*G06F 15/16* (2006.01)
*G06F 17/30* (2006.01)
*H04L 29/06* (2006.01)
*G06F 15/173* (2006.01)

(52) U.S. Cl. ............................. 726/3; 713/151; 709/225

(58) Field of Classification Search .................. 726/1, 5, 726/10, 14, 21, 3; 713/175, 182, 185; 709/217–219, 709/225, 227–229

See application file for complete search history.

(56) References Cited

U.S. PATENT DOCUMENTS 7,592,906 B1 * 9/2009 Hanna et al. .................. 340/506
(Continued)

FOREIGN PATENT DOCUMENTS

CN 1976338 A 6/2007
(Continued)

OTHER PUBLICATIONS

TCG Trusted Network Connect TNC IF-IMV. Feb. 5, 2007. TCG. v. 1.2. p. 1-91.*

(Continued)

*Primary Examiner* — Christian Laforgia
(74) *Attorney, Agent, or Firm* — J.C. Patents

(57) ABSTRACT

A trusted network connect (TNC) system based on tri-element peer authentication (TePA) is provided. An network access requestor (NAR) of an access requestor (AR) is connected to a TNC client (TNCC), and the TNCC is connected to and integrity measurement collector ($IMC_1$) through a integrity measurement collector interface (IF-IMC). An network access controller (NAC) of an access controller (AC) is connected to a TNC server (TNCS) in a data bearer manner. The TNCS is connected to an $IMC_2$ through the IF-IMC. A user authentication service unit (UASU) of a policy manager (PM) is connected to a platform evaluation service unit (PESU) through an integrity measurement verifier interface (IF-IMV). Thus, the technical problems in the prior art of poor extensibility, complex key agreement process, and low security are solved. TePA is adopted in both the network access layer and the integrity evaluation layer to implement mutual user authentication and platform integrity evaluation, so that the security of the entire TNC architecture is improved.

6 Claims, 2 Drawing Sheets

U.S. PATENT DOCUMENTS

| | | | |
|---|---|---|---|
| 7,793,096 B2 * | 9/2010 | Hurst et al. | 713/156 |
| 7,827,545 B2 * | 11/2010 | Choe et al. | 717/168 |
| 7,827,593 B2 * | 11/2010 | Smith et al. | 726/3 |
| 7,849,495 B1 * | 12/2010 | Huang et al. | 726/1 |
| 7,982,595 B2 * | 7/2011 | Hanna et al. | 340/506 |
| 2006/0015718 A1 | 1/2006 | Liu et al. | 713/164 |
| 2007/0136577 A1 | 6/2007 | Bade et al. | 713/164 |
| 2007/0143629 A1 * | 6/2007 | Hardjono et al. | 713/189 |
| 2008/0288777 A1 * | 11/2008 | Lai et al. | 713/171 |
| 2009/0077631 A1 * | 3/2009 | Keohane et al. | 726/3 |
| 2010/0031031 A1 * | 2/2010 | Tian et al. | 713/156 |
| 2010/0037302 A1 * | 2/2010 | Lai et al. | 726/5 |
| 2010/0251334 A1 * | 9/2010 | Xiao et al. | 726/3 |

FOREIGN PATENT DOCUMENTS

| | | |
|---|---|---|
| CN | 101136928 A | 3/2008 |
| CN | 101159640 A | 4/2008 |

OTHER PUBLICATIONS

Trusted Network Connect—Open Standards for Integrity-based Network Access Control. 2005. Trusted Computing Group. p. 1-4.*

International Search Report of International Application No. PCT/CN2008/071699, dated Nov. 6, 2008.

Ge Qin et al, "Research on Trusted Platform Module" Journal of Information Engineering University, vol. 7, No. 4, (Dec. 2006), (Abstract).

Xinquan He, "TNC—Trusted Network Connection" Netinfo Security, (Mar. 2007), pp. 71, (Abstract).

* cited by examiner

TRUSTED NETWORK CONNECT SYSTEM BASED ON TRI-ELEMENT PEER AUTHENTICATION

The application is a continuation of international Application No. PCT/CN2008/071699, filed on Jul. 21, 2008, which claims the benefit of Chinese Patent Application No. 200710018414.7, filed on Aug. 3, 2007. The contents of the above identified applications are incorporated herein by reference in their entirety.

FIELD OF THE TECHNOLOGY

The present invention relates to the field of network security technologies, and more particularly to a trusted network connect (TNC) system based on tri-element peer authentication (TePA).

BACKGROUND

With the development of informationalization, the problem of malicious software such as viruses and worms gets worse. Currently, more than 35,000 forms of malicious software have emerged, and more than 40,000,000 computers are infected each year. In order to prevent these attacks, not only secure transmission and data input check need to be solved, but also the defense has to start from the source, that is, each endpoint connected to the network. However, conventional security defense technologies can no longer defend against various malicious attacks.

To solve the above problem, the Trusted Computing Group (TCG) specifically developed a network connection specification—Trusted Network Connect (TNC) based on trusted computing technologies, briefly referred to as TCG-TNC, which includes an open architecture for endpoint integrity and a set of standards for ensuring secure interoperation. The set of standards may protect a network as required by a user to a user-defined level. Substantially, the TCG-TNC is to establish a connection based on integrity of the endpoints. Firstly, a set of internal system running state policies are established for a trusted network. Only endpoints complying with the created network policies can access the network, and devices not complying with the policies will be isolated and located by the network. Due to the use of a trusted platform module (TPM), attacks by root kits may be blocked. The root kits is an attack script, a modified system program, or a whole set of attack scripts and tools, and is adapted to illegally obtain the maximum control authority to a target system.

As shown in FIG. 1, a TCG-TNC architecture in the prior art includes three logical entities, namely, an access requestor (AR), a policy enforcement point (PEP), and a policy decision point (PDP), and may be distributed at any position in a network. The TCG-TNC architecture may be longitudinally divided into a network access layer, an integrity evaluation layer, and an integrity measurement layer. The network access layer includes three components, namely, a network access requestor (NAR), a policy enforcer (PE), and a network access authority (NAA), as well as a network authorization transport protocol interface (IF-T) and a policy enforcement point interface (IF-PEP). The network access layer is adapted to support conventional network connection technologies. The integrity evaluation layer is responsible for evaluating the integrity of all entities requesting for network access. The integrity evaluation layer has two important interfaces, namely, an integrity measurement collector interface (IF-IMC) and an integrity measurement verifier interface (IF-IMV). In addition, the integrity evaluation layer further has a TNC client-server interface (IF-TNCCS) between the TNC client (TNCC) and the TNC server (TNCS). The integrity measurement layer includes two components, namely, an integrity measurement collector (IMC) and an integrity measurement verifier (IMV), which are responsible for collecting and verifying integrity-related information for the AR.

The information transmission process for a complete trusted network connection of the TCG-TNC architecture in the prior art is that: before the network connection is established, the TNCC needs to prepare required platform integrity information and transmit the information to the IMC. In an endpoint with a TPM, platform information required by the network policy is hashed and then stored into platform configuration registers (PCRs), and the TNCS needs to predefine a platform integrity verification requirement and transmit the requirement to the IMV. The specific process is as follows:

(1) The NAR initiates an access request to the PE.

(2) The PE sends an access request description to the NAA.

(3) Upon receiving the access request description of the NAR, the NAA performs a user authentication protocol with the NAR. When the user authentication is successful, the NAA sends the access request and information indicating that the user authentication is successful to the TNCS.

(4) Upon receiving the access request and the information indicating that the user authentication is successful sent by the NAA, the TNCS starts to perform mutual platform credential authentication with the TNCC, for example, verifying an attestation identity key (AIK) of the platform.

(5) When the platform credential authentication is successful, the TNCC indicates to the IMC that a new connection request has occurred and that an integrity handshake needs to be carried out by the TNCC. The IMC returns required platform integrity information through the IF-IMC. The TNCS transmits the platform integrity information to the IMV through the IF-IMV.

(6) During the integrity handshake, the TNCC and the TNCS need to exchange data one or more times until the TNCS is satisfied.

(7) When the TNCS has completed the integrity check handshake with the TNCC, the TNCS sends a recommendation to the NAA to request for granting access. The PDP may still have the option of not granting network access if other security policy requirements have not been met by the AR.

(8) The NAA sends an access decision to the PE, and finally, the PE enforces the decision to control the access of the AR.

Currently, no mature TCG-TNC architecture product is available on the market. Some important technologies for the TCG-TNC architecture are still at the stage of research and specification development, and the TCG-TNC architecture mainly has the following disadvantages:

1. Poor extensibility. Since a secure channel is predefined between the PEP and the PDP, and the PDP may manage a large number of PEPs, the PDP has to configure a large number of secure channels, and thus the management becomes complex, resulting in poor extensibility.

2. Complex key agreement process. Since security protection is required for data in the network access layer, a secure channel needs to be established between the AR and the PDP, that is, session key agreement needs to be implemented between the AR and the PDP. However, since data protection is also required between the AR and the PEP, session key agreement needs to be implemented again between the AR and the PEP, resulting in a complex key agreement process.

3. Low security. A master key that the AR and the PDP agree upon is transmitted to the PEP by the PDP. New points of attack are introduced by the transmission of the key over the network, so that the security is degraded. In addition, as the same master key is used in the two session key agreement, the security of the entire TNC architecture is also degraded.

4. The AR may fail to validate the AIK certificate of the PDP. During the platform credential authentication, the AR and the PDP performs mutual platform credential authentication by using AIK private keys and certificates, and both endpoints need to validate the AIK certificates. If the PDP is an Internet service provider (ISP) of the AR, the AR cannot access the network, that is, cannot validate the AIK certificate of the PDP, until a trusted network connection is established, resulting in insecurity.

5. Platform integrity evaluation is not peer-to-peer. In the TCG-TNC architecture, the PDP performs platform integrity evaluation on the AR, but the AR does not perform platform integrity evaluation on the PDP. If the platform of the PDP is not trusted, connection of the AR to an untrusted device is not secure. However, peer-to-peer trust is necessary in Ad hoc networks.

SUMMARY

The present invention provides a TNC system based on TePA, which can solve the problems in the prior art of poor extensibility, complex key agreement process and low security, and problem that the AR may fail to validate the AIK certificate and that platform integrity evaluation is not peer-to-peer.

Technical solutions of the present invention are provided as follows.

A TNC system based on TePA is provided, which includes an AR, an access controller (AC), and a policy manager (PM).

The AR and the AC are connected through protocol interfaces, the AC and the PM are connected through protocol interfaces, and the AR is connected to the PM through the AC.

The protocol interfaces connecting the AR and the AC include: an IF-T adapted to implement mutual user authentication and key agreement between the AR and the AC, and mutual access control between the AR and the AC; and an IF-TNCCS adapted to implement platform integrity evaluation between the AR and the AC by enabling the PM to validate AIK certificates of the AR and the AC and verify platform integrity of the AR and the AC.

The protocol interfaces connecting the AC and the PM include: a user authentication authorization interface (IF-UAA) adapted to implement mutual user authentication and key agreement between the AR and the AC, and mutual access control between the AR and the AC; a platform evaluation authorization interface (IF-PEA) adapted to implement platform integrity evaluation between the AR and the AC, and enable the PM to validate AIK certificates of the AR and the AC and verify platform integrity of the AR and the AC; and an integrity measurement interface (IF-M) adapted to collect and verify platform integrity-related information of the AC. An IF-M adapted to collect and verify platform integrity-related information of the AR is provided between the AR and the PM.

Preferably, the AR includes an NAR, a TNCC and an $IMC_1$. The NAR is connected to the TNCC in a data bearer manner, and the TNCC is connected to the $IMC_1$ through an IF-IMC.

The AC includes a network access controller (NAC), a TNCS and an $IMC_2$. The NAC is connected to the TNCS in a data bearer manner, and the TNCS is connected to the $IMC_2$ through the IF-IMC.

The PM includes a user authentication service unit (UASU), a platform evaluation service unit (PESU) and an IMV. The UASU is connected to the PESU in a data bearer manner, and the PESU is connected to the IMV through an IF-IMV.

The NAR is connected to the NAC through the IF-T, and the NAC is connected to the UASU through the IF-UAA.

The TNCC is connected to the TNCS through the IF-TNCCS, and the TNCS is connected to the PESU through the IF-PEA.

The $IMC_1$ of the AR is connected to the IMV through the IF-M, and the $IMC_2$ of the AC is connected to the IMV through the IF-M.

Preferably, the AR and the AC are logical entities with a TPM.

Preferably, the $IMC_1$ of the AR is a component adapted to collect platform integrity information pre-prepared by the TNCC, the $IMC_2$ of the AC is a component adapted to collect platform integrity information pre-prepared by the TNCS, and the IMV is a component adapted to receive a platform integrity verification requirement predefined by the TNCC and the TNCS and perform platform integrity verification on the AR and the AC.

It can be seen from the above technical solutions that, key agreement is performed between the AR and the AC, such that data in the platform integrity evaluation process and service data after the trusted network connection are directly protected without performing any other session key agreement, thereby simplifying the key agreement process and improving the security of the trusted network connection. The master key generated in the authentication process does not need to be transmitted in the network, so that the security of the key is ensured.

In addition, in the present invention, a TePA method, that is, a third party-based mutual authentication method, is adopted in the integrity evaluation layer to respectively authenticate and verify the AIK certificates and platform integrity of the AR and the AC in a centralized manner, so that not only the security in the platform integrity evaluation process is enhanced, but the key management and integrity verification mechanisms of the TNC architecture are also simplified.

Moreover, in the present invention, the TePA method is not only adopted to implement mutual user authentication in the network access layer, but also adopted to implement mutual platform integrity evaluation in the integrity evaluation layer, so that the security of the entire TNC architecture is improved.

In practical applications, a PM may manage a large number of ACs. Through the present invention, the requirements for strong security association between the ACs and the PM can be eliminated, thereby improving the extensibility of trusted network connections.

PEP: policy enforcement point; PE: policy enforcer; PDP: policy decision point; NAA: network access authority; AR: access requestor; AC: access controller; PM: policy manager; $IMC_1$: integrity measurement collector of the AR; $IMC_2$: integrity measurement collector of the AC; IMV: integrity measurement verifier; TNCC: TNC client; TNCS: TNC server; PESU: platform evaluation service unit; NAR: network access requestor; NAC: network access controller; UASU: user authentication service unit; IF-T: network authorization transport protocol interface, a protocol interface between the NAR and the NAC; IF-UAA: user authentication authorization interface, a protocol interface between the NAC and the UASU; IF-TNCCS: integrity evaluation interface, a protocol interface between the TNCC and the TNCS; IF-PEA: platform evaluation authorization interface, a protocol interface between the TNCS and the PESU; IF-IMC: integrity measurement collector interface, a protocol interface between the TNCC and the $IMC_1$, and also a protocol interface between the TNCS and the $IMC_2$; IF-IMV: integrity measurement verifier interface, a protocol interface between the PESU and the IMV; IF-M: integrity measurement interface, a protocol interface between the $IMC_1$ and the IMV, and also a protocol interface between the $IMC_2$ and the IMV.

DETAILED DESCRIPTION

Figure 1:
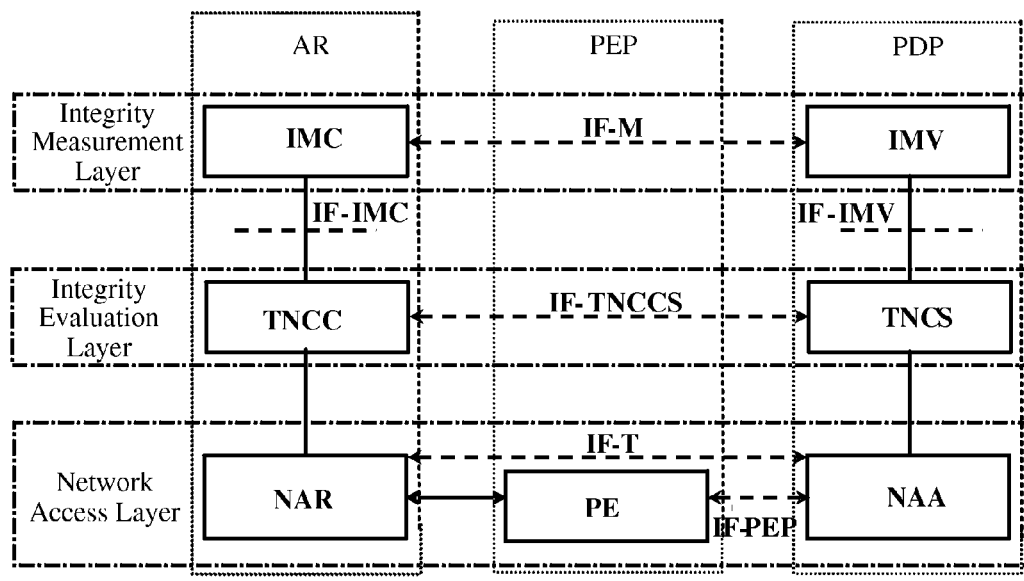
FIG. 1 is a schematic view of a TCG-TNC architecture in the prior art.
Figure 2:
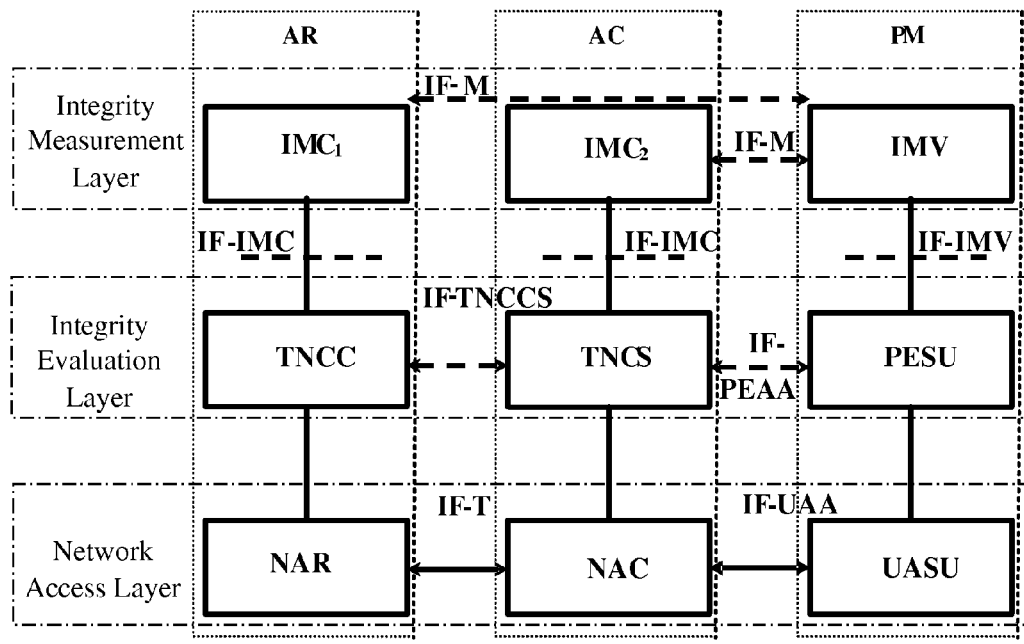
FIG. 2 is a schematic view of a TNC architecture according to the present invention.

Referring to FIG. 2, the present invention includes three logical entities, namely, an AR, an AC, and a PM, and may be distributed at any position in a network. The AR is also referred to as a requestor, a subscriber station, or the like; the AC is also referred to as an authentication access controller, a base station, an access server, or the like; and the PM is also referred to as an authentication server, a trusted server, a remote server, or the like. The AR and the AC are connected through protocol interfaces, the AC and the PM are connected through protocol interfaces, and the PM is connected to the AR through the AC.

The AR includes an NAR, a TNCC, and an $IMC_1$. The NAR is connected to the TNCC in a data bearer manner, and adapted to forward messages from the TNCC. The TNCC is connected to the $IMC_1$ through an IF-IMC, so as to implement communication of the $IMC_1$ of the AR with an IMV.

The AC includes an NAC, a TNCS, and an $IMC_2$. The NAC is connected to the TNCS in a data bearer manner, and adapted to forward messages from the TNCS. The TNCS is connected to the $IMC_2$ through the IF-IMC, so as to implement communication of the $IMC_2$ of the AC with an IMV.

The PM includes a UASU, a PESU, and an IMV. The UASU is connected to the PESU in a data bearer manner, and adapted to forward messages from the PESU. The PESU is connected to the IMV through an IF-IMV, so as to implement communication of the IMV with the $IMC_i$ of the AR and communication of the IMV with the $IMC_2$ of the AC.

The NAR, the NAC, and the UASU constitute a network access layer. The NAR is connected to the NAC through the IF-T, and the NAC is connected to the UASU through the IF-UAA. The network access layer is responsible for implementing mutual user authentication and key agreement between the AR and the AC, and mutual access control between the AR and the AC according to a network user authentication result and a platform integrity evaluation result. The network access layer adopts an access control method based on TePA, which is a network access control technology used in China WLAN standards.

The TNCC, the TNCS and the PESU constitute an integrity evaluation layer. The TNCC is connected to the TNCS through the IF-TNCCS, and the TNCS is connected to the PESU through the IF-PEA. The integrity evaluation layer is responsible for implementing platform integrity evaluation between the AR and the PM, including platform credential authentication and platform integrity verification. The PM is responsible for validating AIK certificates of the AR and the AC and verifying platform integrity of the AR and the AC. In the integrity evaluation layer, the TNCC, the TNCS, and the PESU perform TePA, that is, third party-based mutual authentication.

The $IMC_1$ of the AR, the $IMC_2$ of the AC and the IMV constitute an integrity measurement layer. The $IMC_1$ of the AR is connected to the IMV through the IF-M, and the $IMC_2$ of the AC is connected to the IMV through the IF-M. The integrity measurement layer is responsible for collecting and verifying platform integrity-related information of the AR and the AC.

Figure 3:
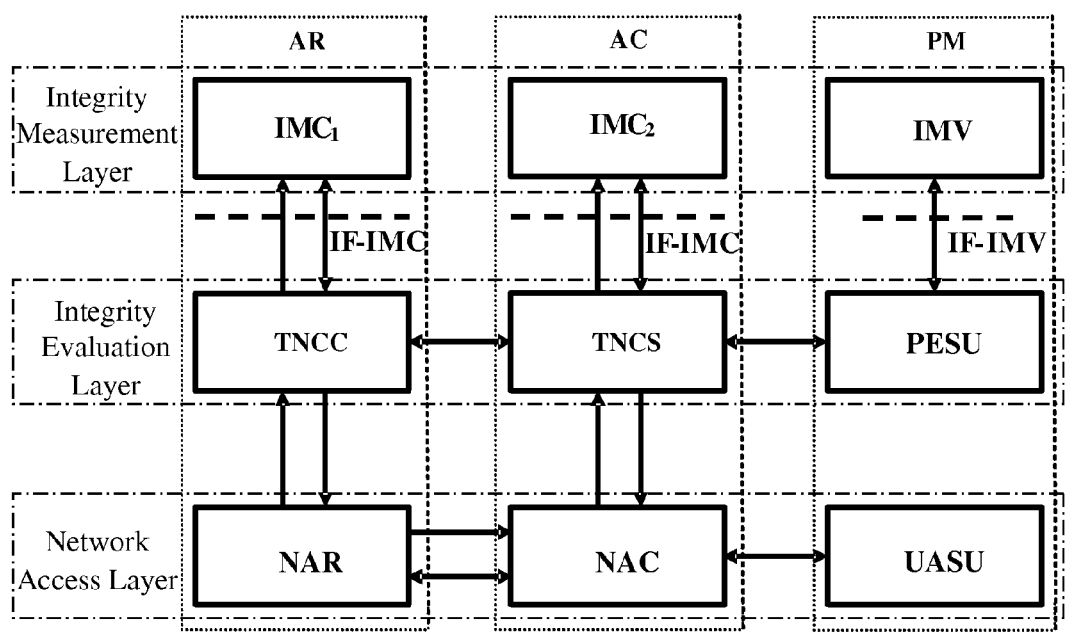
FIG. 3 is a schematic view of an information transmission process for a complete trusted network connection according to the present invention.

Referring to FIG. 3, a trusted network connection based on TePA applying the present invention includes the following steps:

(1.) Before a network connection is established, initialization is performed first.

(1.1) The TNCC of the AR pre-prepares platform integrity information, and transmits the information to the $IMC_1$ of the AR. The TNCS of the AC pre-prepares platform integrity information, and transmits the information to the $IMC_2$ of the AC.

(1.2) The TNCC and the TNCS predefine an integrity verification requirement, and the requirement includes PCRs lists that the AR and the AC request each other to verify.

(1.3) TPMs of the AR and the AC hash information required by the network policy and then store the hashed information into PCRs.

(2.) User authentication is performed.

(2.1) The NAR initiates an access request to the NAC.

(2.2) Upon receiving the access request from the NAR, the NAC starts a mutual user authentication process, and the NAR, the NAC, and the UASU in the network access layer start to perform a TePA protocol, so as to implement mutual user authentication and key agreement between the AR and the AC.

(2.3) When the mutual user authentication is successful, the NAR and the NAC respectively transmit information indicating that the user authentication is successful to the TNCC and the TNCS, and control ports of the NAR and the NAC according to the user authentication result.

(3.) Integrity evaluation is performed.

When the TNCS of the AC receives the information indicating that the user authentication is successful sent from the NAC, the TNCC, the TNCS, and the PESU in the integrity evaluation layer implement platform integrity evaluation between the AR and the AC by using a TePA protocol.

The platform integrity evaluation may be implemented by the following methods:

① Platform credential authentication: the PM validates AIK certificates of the AR and the AC.

② Platform integrity verification: the PM verifies platform integrity of the AR and the AC.

(4.) Access control is performed.

The TNCS and the TNCC respectively summarize platform integrity evaluation results of the AC and the AR, and then respectively send a recommendation to the NAR and the NAC. The NAR and the NAC respectively control ports according to the received recommendation, so as to implement mutual access control between the AR and the AC.

In the present invention, key agreement is performed between the AR and the AC, such that data in the platform integrity evaluation process and service data after the trusted network connection are directly protected without performing any other session key agreement, thereby simplifying the key agreement process and improving the security of the trusted network connection. The master key generated in the authentication process does not need to be transmitted in the network, so that the security of the key is ensured.

In addition, a TePA method, that is, a third party-based mutual authentication method, is adopted in the integrity evaluation layer to respectively authenticate and verify the AIK certificates and platform integrity of the AR and the AC in a centralized manner, so that not only the security in the platform integrity evaluation process is enhanced, but the key management and integrity verification mechanisms of the TNC architecture are also simplified.

Moreover, in the present invention, the TePA method is not only adopted to implement mutual user authentication in the network access layer, but also adopted to implement mutual platform integrity evaluation in the integrity evaluation layer, so that the security of the entire TNC architecture is improved.

Furthermore, in practical applications, a PM may manage a large number of ACs. Through the present invention, the requirements for strong security association between the ACs and the PM can be eliminated, thereby improving the extensibility of trusted network connections.

The TNC system based on TePA of the present invention is described in detail above. The principle and implementation of the present invention are described herein through specific examples. The description about the embodiments of the present invention is merely provided for ease of understanding of the solutions of the present invention. Persons of ordinary skill in the art can make variations and modifications to the present invention in terms of the specific implementations and application scopes according to the ideas of the present invention. Therefore, the specification shall not be construed as limitations to the present invention.

What is claimed is:

1. A trusted network connect (TNC) system based on tri-element peer authentication (TePA), comprising an access requestor (AR), an access controller (AC), and a policy manager (PM), wherein
   the AR and the AC are connected through protocol interfaces, the AC and the PM are connected through protocol interfaces, and the AR is connected to the PM through the AC;
   the protocol interfaces connecting the AR and the AC comprise: a network authorization transport protocol interface (IF-T) configured to implement mutual user authentication and key agreement between the AR and the AC, and mutual access control between the AR and the AC; and a integrity evaluation Interface (IF-TNCCS) configured to implement platform integrity evaluation between the AR and the AC by enabling the PM to validate attestation identity key (AIK) certificates of the AR and the AC and verify platform integrity of the AR and the AC;
   the protocol interfaces connecting the AC and the PM comprise: a user authentication authorization interface (IF-UAA) configured to implement mutual user authentication and key agreement between the AR and the AC, and mutual access control between the AR and the AC; a platform evaluation authorization interface (IF-PEA) configured to implement platform integrity evaluation between the AR and the AC, and enable the PM to validate AIK certificates of the AR and the AC and verify platform integrity of the AR and the AC; and an integrity measurement interface (IF-M) configured to collect and verify platform integrity-related information of the AC; and
   the IF-M configured to collect and verify platform integrity-related information of the AR is provided between the AR and the PM.

2. The TNC system based on TePA according to claim 1, wherein
   the AR comprises a network access requestor (NAR), a TNC client (TNCC), and an integrity measurement collector (IMC1), the NAR is connected to the TNCC in a data bearer manner, and the TNCC is connected to the IMC1 through an integrity measurement collector interface (IF-IMC);
   the AC comprises a network access controller (NAC), a TNC server (TNCS), and an IMC2, the NAC is connected to the TNCS in a data bearer manner, and the TNCS is connected to the IMC2 through the IF-IMC;
   the PM comprises a user authentication service unit (UASU), a platform evaluation service unit (PESU), and an integrity measurement verifier (IMV), the UASU is connected to the PESU in a data bearer manner, and the PESU is connected to the IMV through an integrity measurement verifier interface (IF-IMV);
   the NAR is connected to the NAC through the IF-T, and the NAC is connected to the UASU through the IF-UAA;
   the TNCC is connected to the TNCS through the IF-TNCCS, and the TNCS is connected to the PESU through the IF-PEA; and
   the IMC1 of the AR is connected to the IMV through the IF-M, and the IMC2 of the AC is connected to the IMV through the IF-M.

3. The TNC system based on TePA according to claim 1, wherein the AR and the AC are logical entities with a trusted platform module (TPM).

4. The TNC system based on TePA according to claim 2, wherein the AR and the AC are logical entities with a trusted platform module (TPM).

5. The TNC system based on TePA according to claim 3, wherein the IMC1 of the AR is a component configured to collect platform integrity information pre-prepared by the TNCC, the IMC2 of the AC is a component configured to collect platform integrity information pre-prepared by the TNCS, and the IMV is a component configured to receive a platform integrity verification requirement predefined by the TNCC and the TNCS and perform platform integrity verification on the AR and the AC.

6. The TNC system based on TePA according to claim 4, wherein the IMC1 of the AR is a component configured to collect platform integrity information pre-prepared by the TNCC, the IMC2 of the AC is a component configured to collect platform integrity information pre-prepared by the TNCS, and the IMV is a component configured to receive a platform integrity verification requirement predefined by the TNCC and the TNCS and perform platform integrity verification on the AR and the AC.

* * * * *